United States Patent
Munoz

[19]

[11] Patent Number: 5,157,868
[45] Date of Patent: Oct. 27, 1992

[54] PASSIVE CHRISTMAS TREE WATERER AND MONITOR

[75] Inventor: William S. Munoz, RD# 10, Box 10824, Newton, N.J. 07860

[73] Assignee: William South Munoz, Newton, N.J.

[21] Appl. No.: 726,395

[22] Filed: Jul. 5, 1991

[51] Int. Cl.⁵ ............................................. A47G 7/02
[52] U.S. Cl. ...................... 47/40.5; 47/48.5; 47/79
[58] Field of Search ................. 47/40.5, 79, 48.5

[56] References Cited

U.S. PATENT DOCUMENTS

| | | | |
|---|---|---|---|
| 1,117,474 | 11/1914 | Benning . | |
| 1,453,401 | 11/1920 | Mattson . | |
| 2,183,970 | 2/1937 | Meissl | 47/38 |
| 2,799,121 | 6/1955 | Modewag | 47/38 |
| 2,938,304 | 5/1960 | Thomas et al. | 47/40.5 |
| 3,137,969 | 6/1964 | Sokol | 47/57.5 |
| 3,469,342 | 9/1969 | Morris | 47/40.5 |
| 3,562,951 | 2/1969 | Schwaderlapp | 47/41.11 |
| 3,697,026 | 10/1972 | Hambnick | 248/46 |
| 4,126,963 | 11/1978 | Dunbar | 47/40.5 |
| 4,148,155 | 4/1979 | Allen | 47/59 |
| 4,653,224 | 3/1987 | Weckesser | 47/40.5 |
| 4,825,587 | 5/1989 | Stancil | 47/40.5 |
| 4,850,137 | 7/1989 | Foster | 47/79 |
| 4,930,252 | 6/1990 | Krause et al. | 47/40.5 |
| 4,993,176 | 2/1991 | Spinosa | 47/40.5 |
| 5,009,028 | 4/1991 | Lorenzana et al. | 47/40.5 |

OTHER PUBLICATIONS

Popular Science "Wordless Workshop" Dec. 1978.

Primary Examiner—David A. Scherbel
Assistant Examiner—Joanne C. Downs

[57] ABSTRACT

A Christmas tree irrigation and fluid monitoring system for supplying water to a conventional tree stand. A water reservoir is equipped with a translucent column through which the fluid level in the system can be monitored on a continuous basis. A tamper resistant mesh covers the top of the reservoir. The reservoir is covered with a lid forming a water tight seal. The lid is equipped with an aperture allowing air to enter reservoir while preventing from spilling if upset. The reservoir is connected to the tree stand with a conduit. The conduit is attached to the tree or the stand. The end of the conduit in the stand is fitted with a crush-resistant collar.

4 Claims, 5 Drawing Sheets

5,157,868

PASSIVE CHRISTMAS TREE WATERER AND MONITOR

BACKGROUND OF THE INVENTION

1. Field of Invention

This invention relates to the apparatus for the irrigation and monitoring of the fluid level in a stand containing a Christmas tree.

2. Description of Prior Art

A freshly harvested Christmas tree requires one to two quarts of water per day to remain hydrated. Many conventional tree stands have a capacity of less than four quarts. This capacity is significantly reduced when the stump of the tree is introduced. Should the tree become dry, needle dropping will accelerate, the tree will become unsightly, and a fire hazard. The chore of adding water to the stand is difficult. The task of crawling under the tree, moving gifts or other decorations aside, being scratched by needles, and checking the level of the liquid in the stand is unpleasant at best. If the level is low, additional liquid must be brought under the tree and lifted over the lip of the stand.

Many efforts to provide adequate Christmas tree irrigation have been put forth. An example is U.S. Pat. No. 4,653,224 to Weckesser composed of a pitcher-shaped reservoir having a conduit extending from its base, into the tree stand. U.S. Pat. No. 4,825,587 to Stanell is similar to Weckesser, except the water is pumped from the reservoir to the stand by a battery operated pump. U.S. Pat. No. 4,930,252 to Kranse and Davis is similar to Stanell, except the pump is driven by household current.

Prior efforts to design an irrigation and monitoring system have yet to incorporate all the important design criteria:

1. The prevalence of children and pets in proximity to the tree and system requires the apparatus be designed with safety foremost. These areas of concern include but are not limited to electrocution, drowning, spilled reservoirs, and their resulting water damage. Keeping the harvested tree adequately hydrated reduces the risk of fire.

2. Because the irrigation and monitoring system is intended for use by the general public, it must be easy to assemble, implement and maintain.

3. The system should be aesthetically pleasing. The decorated Christmas tree is often the focal point of the holiday, and should not be detracted from by unsightly apparatus.

4. The successful pumping of liquid to the stand requires an adequate, dependable energy source for the duration of the holiday season. Constantly checking the stored direct current of the system and proper functioning of the mechanical parts detracts from its intended convenience.

5. Even though the addition of a reservoir increases the water available to the tree, the current liquid level in the system must be easily monitored on a continuous basis. Continually checking the water level by removing adjacent Christmas packages and decorations detract from the system's utility.

Therefore, the principal objectives of the invention are to provide a safe, simple, aesthetic, and convenient method of automatically irrigating the Christmas tree. It must also provide a means of constant fluid level indication in the system.

SUMMARY OF THE INVENTION

The irrigation and monitoring system is designed to provide a safe and dependable water supply to augment the limited storage capacity in a conventional Christmas tree stand. The system is also unobtrusive in appearance.

The invention is designed to provide superior service addressing the parameters mentioned previously. Steps to ensure the safe operation of the system include a mesh top over the reservoir. This is to prevent children and/or pets from disturbing the water and possible drowning while the reservoir lid is off. The mesh also reduces the likelihood of extension cords and Christmas tree lights falling into the reservoir. A reduction in accidental electrocution and fire is the intended result. The mesh top is covered with a lid with a water-tight seal. A conduit is attached to the reservoir in a fashion to make it difficult for a child to disconnect. This helps make the system tamper resistant. The absence of household electrical current to drive the system adds to its safety.

The invention is designed to be simple to assemble, install, operate and maintain. When delivery is taken by the consumer, the system could be obtained fully or partially assembled. If partially assembled, only a few parts would have to be connected. The system can be slid under the tree, and easily attached to the tree or the stand. Water is then added to the reservoir. The reservoir is then raised above the stand to initiate the siphon. The reservoir is then lowered as the liquid levels in the stand and reservoir reach equilibrium. The system has no batteries, avoiding the concern of batteries losing their charge over the period of operation. This eliminates the risk of system failure without notice. The invention has few mechanical parts to wear, break or jam. These features add to the systems ease of assembly, installation, operation and maintenance.

To be aesthetically attractive, the invention is designed to appear like a Christmas package. This avoids the detractive facade which may accompany such an invention.

A float may be placed in the monitoring column to provide a more discernable indication of the liquid level. The indicator floating at the top of the liquid gives a constant reading of the elevation of the liquid in the system. This avoids continually moving packages and decorations to check fluid levels. It also gives the operator an indication as to when the system will require additional fluid.

DETAILED DESCRIPTION OF INVENTION

The invention, as depicted in FIGS. 1-10, is further described by using reference numbers. These reference numbers are used to define the segment of the invention being described. The reservoir of the invention is referred to by the number 100, parts of which are numbered in increments of one, starting with 101. The conduit is part number 200. Parts of the conduit are numbered sequentially, starting with the number 201. The tree stand is numbered 300, and parts thereof sequentially beginning with 301.

Figure 1:
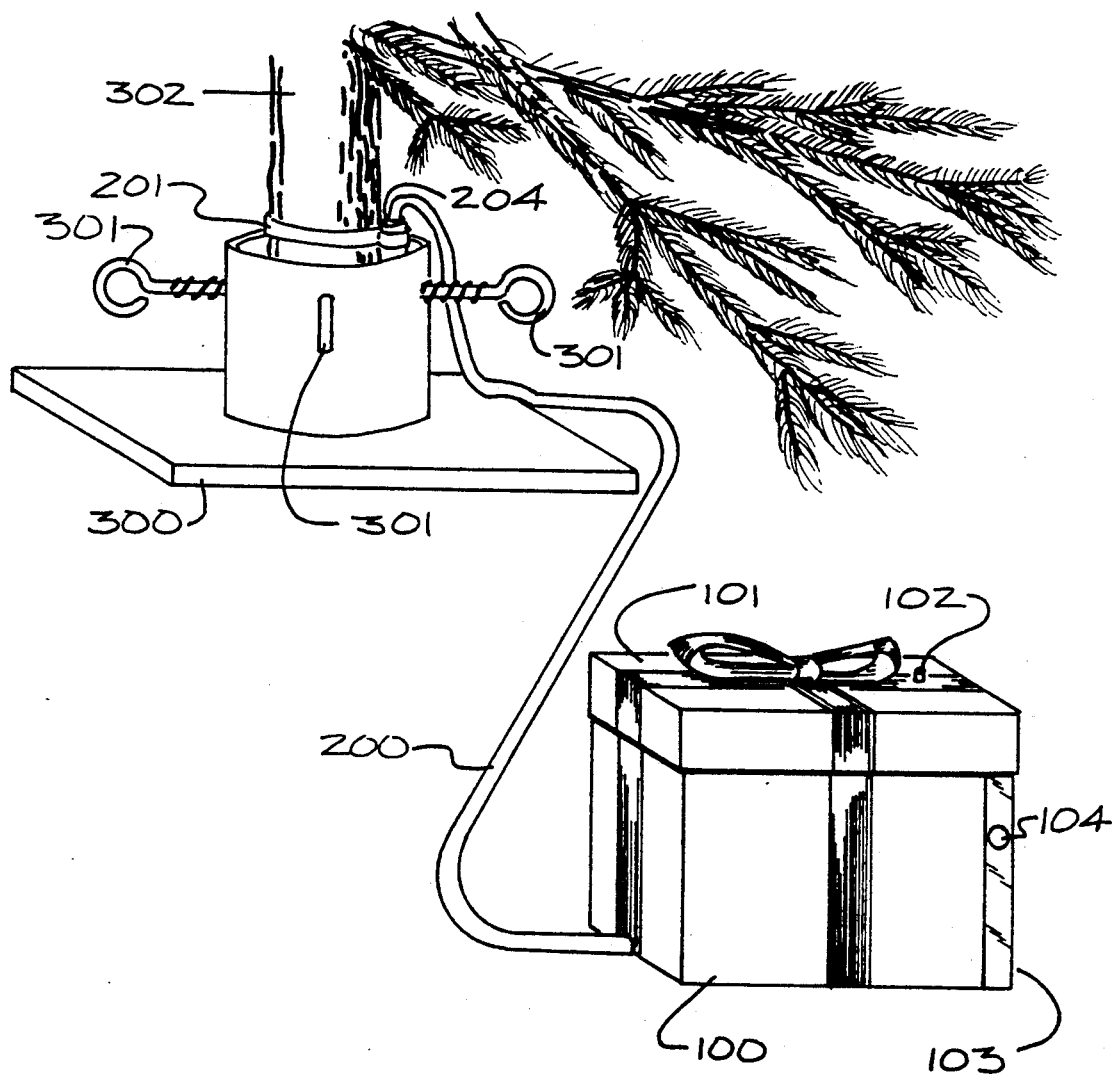
FIG. 1 is a perspective view of the installed invention.
Figure 2:
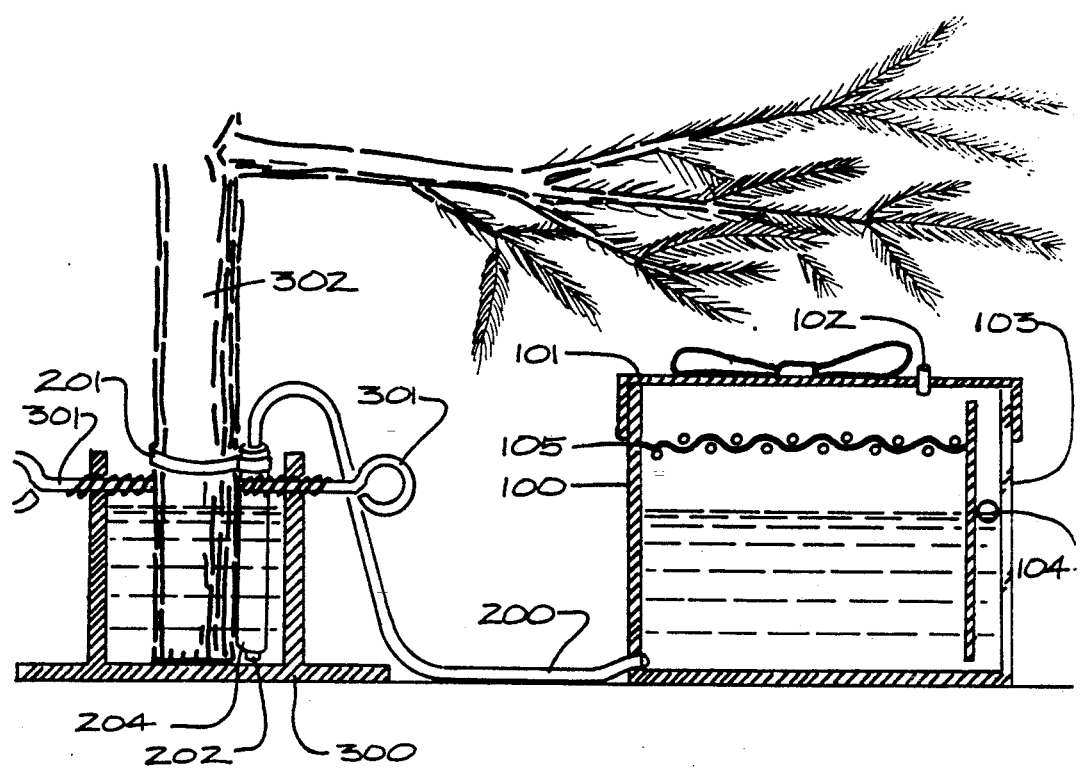
FIG. 2 is a vertical section taken through the reservoir, conduit and stand.
Figures 3, 4:
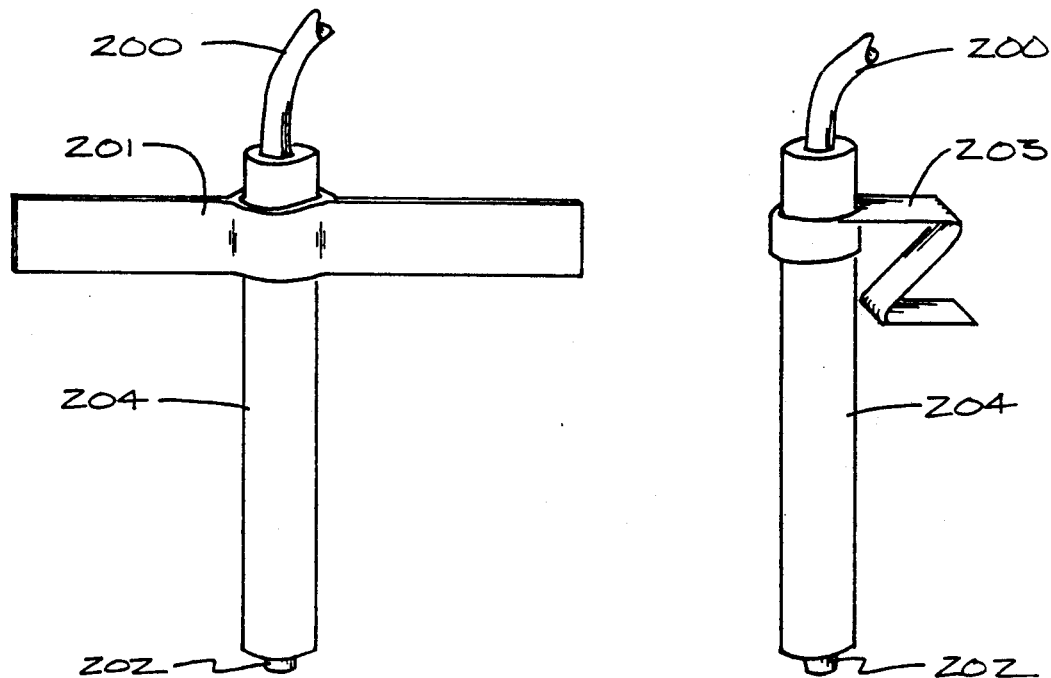
FIG. 3 is a side elevation view of the conduit to be attached to the tree.
FIG. 4 the same as FIG. 3, except fitted with device to attach to the tree stand.

As shown in FIGS. 1 and 2, a reservoir 100 is connected to a conduit 200. The fastening device 201 is attached to conduit 200 as shown in FIG. 3. The fastening device 201 is attached a sufficient distance from conduit end 202 to ensure it will extend to the bottom of tree stand reservoir 300.

Figure 5:
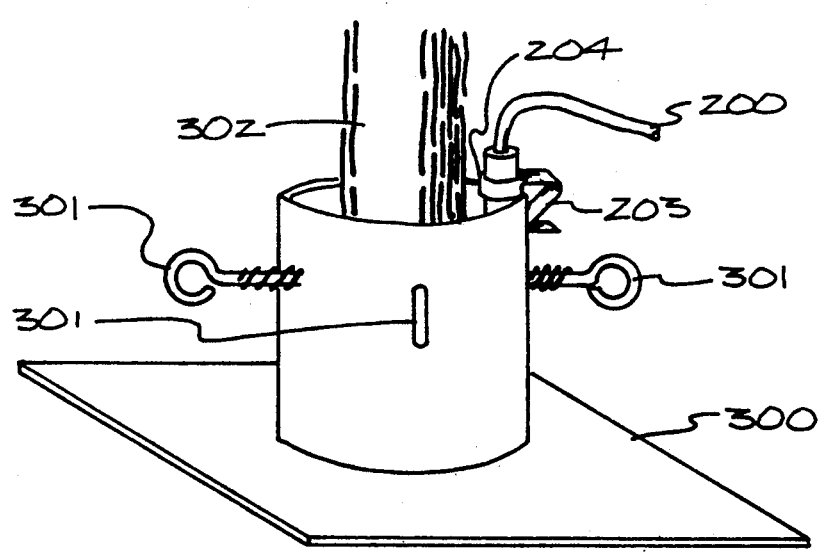
FIG. 5 is a perspective view of FIG. 4.

If the fastener is to be attached to stand 300, part 202 is substituted for 201, as shown in FIG. 4. Fastener 202 can then be attached to stand 300 as shown in FIG. 5.

A crush-resistant collar 204 is fitted over conduit 200, between fastener 201 or 203 and end 202. This is depicted in FIGS. 3 and 4.

Figure 6:
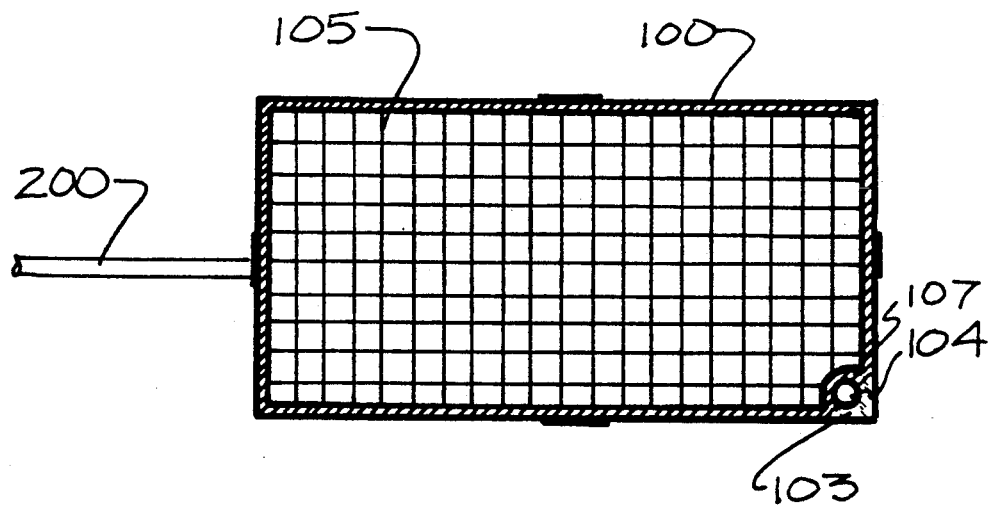
FIG. 6 is a plan view of the reservoir without lid.
Figure 7:
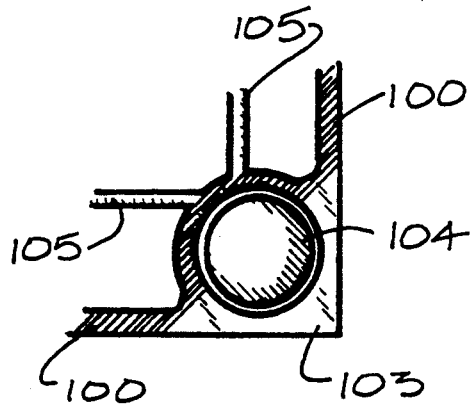
FIG. 7 is a plan view of the fluid monitoring column.
Figure 8:
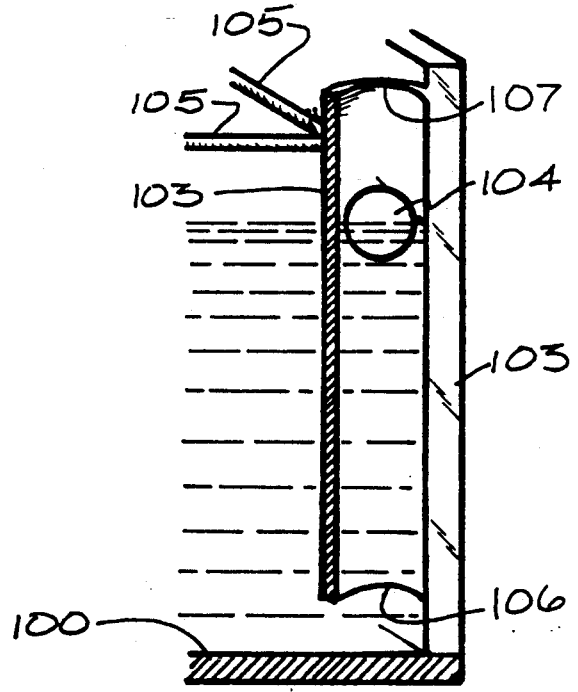
FIG. 8 is cross-sectional view of FIG. 7.

Fluid is added to reservoir 100, by pouring it through mesh 105 shown in FIGS. 2 and 6. Mesh 105 is designed to allow liquid to pass through, resist tampering by children and pets, and to prevent electric lights, extension cords and ornaments from falling into reservoir 100.

Reservoir 100 is raised until fluid begins flowing through conduit 200 into stand 300. Once the siphoning has commenced, the bottom of reservoir 100 is placed on the same plane as tree stand base 300. Care must be taken to keep the fluid below the eye screw 301 holes in stand 300. This is done to avoid leakage through junction between eye screws 301 and stand 300. The liquid will reach equilibrium in the system, resulting in constant fluid surface elevation.

Monitoring column 103 depicted in FIGS. 1, 2, 7 and 8 should be translucent to clear. This enables the observer to easily monitor fluid levels in the system. Dyes can be added to enhance the ease of monitoring fluid levels. A small buoyant object 104 which can move freely within monitoring conduit 103 may be installed. This is used to enhance defining the fluid surface. Monitoring column 103 is designed to allow liquid to migrate through bottom 106, and air through top 107, while not allowing buoyant object 104 to escape.

Lid 101 is attached tightly to reservoir 100 to establish a water-tight seal. The seal reduces the likelihood of leaking and resulting shock if reservoir 100 is upset. It also prevents tampering by children and pets. As tree 302 consumes fluid from reservoir 100, air must enter the system to replace the removed liquid.

Figure 9:
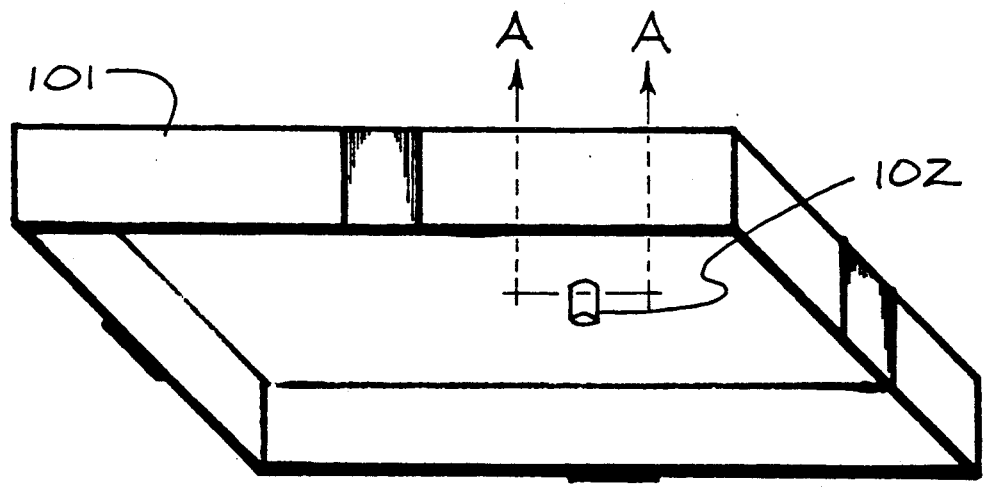
FIG. 9 is an exploded view of the reservoir lid.

Air enters through lid 101 via aperture 102 as seen in FIG. 9. To maintain the water tight seal in case of disturbance, aperture 102 is equipped with mechanism 107. It allows air to enter through the lid 101. It also effectively inhibits water from exiting aperture 102 if the system is upset.

Figure 10:
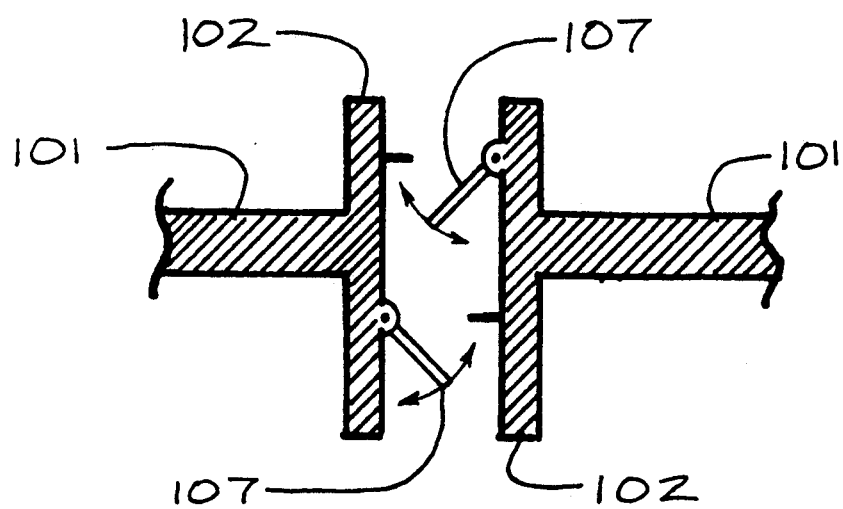
FIG. 10 is a cross-section of fluid leakage inhibitor shown in FIG. 3, through section A—A.

FIG. 10 illustrates one solution. The hinged gates 107 fall open when lid 101 is in a horizontal position. In this state, it allows air to pass through freely. When reservoir 100 is disturbed, water may try to escape through aperture 102. The force of the liquid traveling through aperture 102 will cause the hinged gates 107 to close, restricting the migration of the fluid.

The invention has been described with an emphasis on safety. Alternating electrical current has been avoided. Mesh 105 and the water-tight seal between reservoir 100 and lid 101 is intended to deter children and pets, and prevent objects from falling into reservoir 100 during refilling. An air inlet aperture 102 is designed to close if the sealed system is upset. The risk of accidental electrocution, drowning and property damage from water has been reduced by the inclusion of these features.

Accordingly, the reader will see the tree waterer and monitor will significantly increase the quantity of liquid available to the tree. Crawling under the tree to fill the stand will be unnecessary. A continuous indication of the fluid level in the system via monitoring column 103 will be available without removing surrounding objects and opening reservoir 100. Batteries to drive a pump, which would require attention through out its operation, have been avoided. These features add to the systems convenience.

The invention has few mechanical parts. This adds to its simplicity of implementation, and dependable operation, and safety.

The invention is finished to render it unobtrusive when placed in proximity to the tree.

Although the preceding descriptions and drawing contain many specificities, they should not be construed as to limit the application or design of the invention. Rather, they are for illustrative purposes. For example, water may be replaced by a nutrient fluid; reservoir 101 could be in the cubic, rectangular, cylindrical or in the shape of a toy or decoration; conduit 200 could exit reservoir 100 through the bottom, or lid 101; air inlet aperture 102 may be of a different design.

I claim:

1. A Christmas tree irrigation system comprised of:
a tree stand having a first reservoir, capable of securing said tree in an upright position;
a second reservoir spaced a distance from said first reservoir, including a mesh cover, fluid level monitoring column with colorful floatation device, and leak resistant lid, said second reservoir including a conduit with crush resistant collar capable of transmitting fluid from said second reservoir to said tree stand.

2. An irrigation system according to claim 1 wherein said leak resistant lid permits air to enter said second reservoir to replace displaced fluid through an aperture in said lid, said lid being to restrict the egress of said fluid when said reservoir is disturbed.

3. An irrigation system according to claim 1 wherein said leak resistant lid is formed and/or decorated to render the appearance of an article associated with said tree.

4. An irrigation system according to claim 1 wherein said mesh cover allows fluid to pass through readily while being resistant to invasion by children, pets, Christmas tree lighting apparatus and ornaments while the leak resistant lid is removed.

* * * * *